United States Patent
Snyder et al.

(10) Patent No.: US 6,786,623 B2
(45) Date of Patent: Sep. 7, 2004

(54) VEHICLE COMBINATION LIGHT WITH INTEGRATED ACCESSORY LIGHT FOR ILLUMINATION

(75) Inventors: Mark D. Snyder, Bloomfield, MI (US); William G. Bowes, Macomb Township, MI (US); David Plentis, Farmington, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 10/336,035

(22) Filed: Jan. 3, 2003

(65) Prior Publication Data

US 2004/0130902 A1 Jul. 8, 2004

(51) Int. Cl.$^7$ .................................................. B60Q 1/00
(52) U.S. Cl. ........................ 362/485; 362/496; 362/543; 362/544
(58) Field of Search ................................. 362/485, 496, 362/543, 544; 340/468, 469, 473, 472, 479

(56) References Cited

U.S. PATENT DOCUMENTS

| | | | |
|---|---|---|---|
| 4,851,970 A | | 7/1989 | Bronder |
| 4,896,136 A | | 1/1990 | Hotovy |
| 5,711,593 A | * | 1/1998 | Gold ........................... 362/496 |
| 5,795,051 A | | 8/1998 | Galanski |
| 6,000,821 A | | 12/1999 | Beliakoff |
| 6,051,931 A | | 4/2000 | Takei |
| 6,152,586 A | | 11/2000 | Dealey, Jr. et al. |
| 6,238,068 B1 | | 5/2001 | Farmer, Jr. |
| 6,260,990 B1 | | 7/2001 | Saunders |
| 6,431,717 B1 | * | 8/2002 | Anderson et al. ............. 362/31 |

* cited by examiner

Primary Examiner—Thomas M. Sember
(74) Attorney, Agent, or Firm—Foley & Lardner LLP (57) ABSTRACT

A vehicle combination light for use in a vehicle having a compartment includes a housing and a combination light unit arranged in the housing and directed to at least a front or a rear of the vehicle. An accessory light unit is arranged in the housing and directed to an interior of the compartment, such that the accessory light unit is aligned with an opening in a wall of the vehicle that faces toward the interior of the compartment in order to illuminate the interior of the compartment.

32 Claims, 9 Drawing Sheets

VEHICLE COMBINATION LIGHT WITH INTEGRATED ACCESSORY LIGHT FOR ILLUMINATION

BACKGROUND OF THE INVENTION

1. Field of the Invention

The present invention relates generally to vehicle combination light assemblies and vehicles integrated with the vehicle combination light assemblies. More specifically, the present invention is directed to a combination light assembly for a vehicle, such as a pickup truck or a sports utility vehicle (SUV) in which the vehicle combination light assembly includes an integrated accessory light unit that illuminates a compartment of the vehicle that is external to the vehicle cab or cabin. For example, a rear combination light of a pickup truck includes an accessory light unit that illuminates the tailgate and the cargo bed area of the pickup truck proximate to the tailgate. A front combination light may include an accessory light unit that illuminates an engine compartment of the vehicle.

2. Description of the Related Art

Vehicle cargo beds, for example, for a pickup truck are generally not uniformly well illuminated. An exterior light for illuminating the cargo bed is often provided proximate a rear window of the cab of the pickup truck to illuminate the cargo bed. However, such an exterior light does not provide sufficient illumination of the cargo bed portion that is proximate the tailgate of the truck for several reasons. First, the exterior light is located far from the cargo bed portion proximate to the tailgate such that the light does not provide sufficient illumination at a distance corresponding to the location of the cargo bed area proximate to the tailgate. This problem is further exacerbated by the increasing popularity of larger trucks in which the length of the cargo bed area of the pickup truck is greater. Second, the cargo bed area of the pickup truck is often loaded with cargo which obstructs the light from the conventional exterior light located at the rear end of the truck cabin. The cargo may completely obscure the cargo bed area proximate the tailgate or may cast shadows that reduce the effectiveness of the conventional exterior light arranged at a rear end of the cabin.

Another problem with an exterior light arranged in the rear portion of a truck cabin is that the light is located at a relatively high position. Therefore, such an exterior light may not provide sufficient illumination while performing tasks at a lower position or level. For example, such an exterior light may not provide sufficient illumination at the cargo bed level at the rear end of the cargo bed where an operator may be required to thread ties or perform other tasks that require sufficient illumination when performed after dark. Likewise, an area outside the vehicle, adjacent the tailgate, may not be sufficiently illuminated by an exterior light located at a relatively high position in the rear portion of a truck cabin. For example, the area for hitching a tow is a relatively low area that will not be sufficiently illuminated by the conventional exterior light arranged at a relatively high position at a rear end of the truck cabin.

BRIEF SUMMARY OF THE INVENTION

In one aspect, the present invention provides a vehicle combination light for use in a vehicle having a compartment external to the vehicle cab, including: a housing; a combination light unit arranged in the housing and directed to a front or a rear or a side of the vehicle; and an accessory light unit arranged in the housing and directed to an interior of the compartment, wherein the accessory light unit is aligned with an opening in a wall of the vehicle that faces toward the interior of the compartment in order to illuminate the interior of the compartment.

In another aspect, the vehicle comprises a truck, the compartment comprises a rear cargo bed of the truck, the combination light unit is a rear combination light, and the accessory light unit and the opening in the wall of the truck are arranged proximate to a tailgate of the truck.

In a further aspect, the accessory light unit and the opening in the wall of the truck are arranged proximate to a bottom portion of the tailgate of the truck.

In one aspect, the accessory light unit and the opening in the wall of the truck are arranged proximate a hinge by which the tailgate is operated.

In one aspect of the present invention, the housing is attached to a side wall of the truck.

In another aspect, the housing is attached at a rear end of the side wall of the truck.

In one aspect of the present invention, the accessory light unit has a transparent cover facing the opening in the wall of the truck.

In another aspect, the present invention includes a retractable tether attached to the housing, wherein the accessory light unit is connected to one end of the tether. The tether and accessory light unit can be extended through the opening in the wall of the truck so that the accessory light unit may be positioned to illuminate the rear cargo bed of the truck. The tether and the accessory light unit may also be extended through the opening in the wall of the truck so that the accessory light unit can be positioned to illuminate an area outside the rear cargo bed of the truck.

In one aspect, the accessory light unit is configured to be operated by a switch provided inside the cabin of the truck.

In another aspect, the accessory light unit is configured to be operated by a switch provided proximate to the accessory light unit.

In one aspect, the present invention provides a vehicle having a vehicle combination light, comprising: a side wall proximate a cargo bed of the vehicle, wherein the vehicle comprises a truck. The vehicle combination light comprises: a housing; a combination light unit arranged in the housing and directed to a rear of the truck; and an accessory light unit arranged in the housing and directed toward a cargo bed of the truck, wherein the accessory light unit is aligned with an opening in a side wall of the pickup truck that faces toward the interior of the truck in order to illuminate the cargo bed of the truck.

In a further aspect, the vehicle combination light of the vehicle further comprises a tether, attached to the housing, to which the accessory light unit is connected, wherein the tether is designed to be extended through the opening to light the cargo bed of the truck or an area external to the truck, and is designed to be retracted through the opening for storage within or near the housing of the vehicle combination light.

BRIEF DESCRIPTION OF THE DRAWINGS

The accompanying drawings, which are incorporated in and constitute a part of the specification, illustrate a presently preferred embodiment(s) of the invention, and, together with the general description given above and the detailed description given below, serve to explain the principles of the invention.

DETAILED DESCRIPTION OF THE INVENTION

Figure 1:
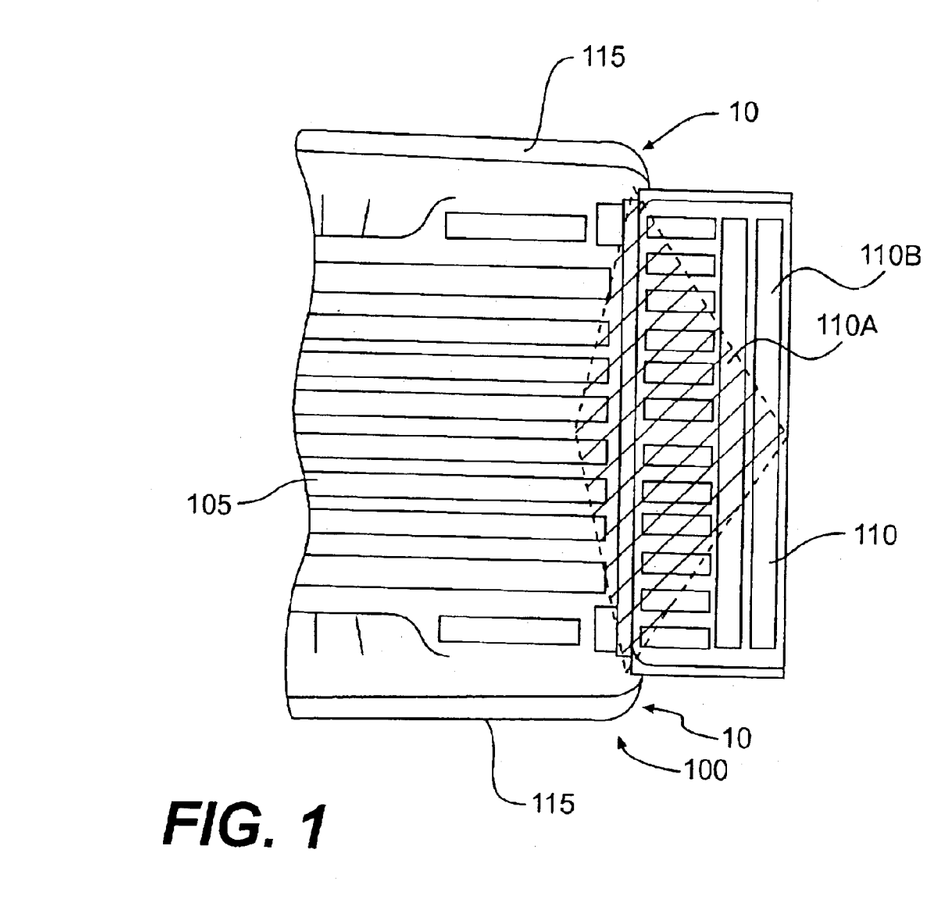
FIG. 1 is a plan view of the cargo bed area of a vehicle with its tailgate in an open position.
Figure 2A:
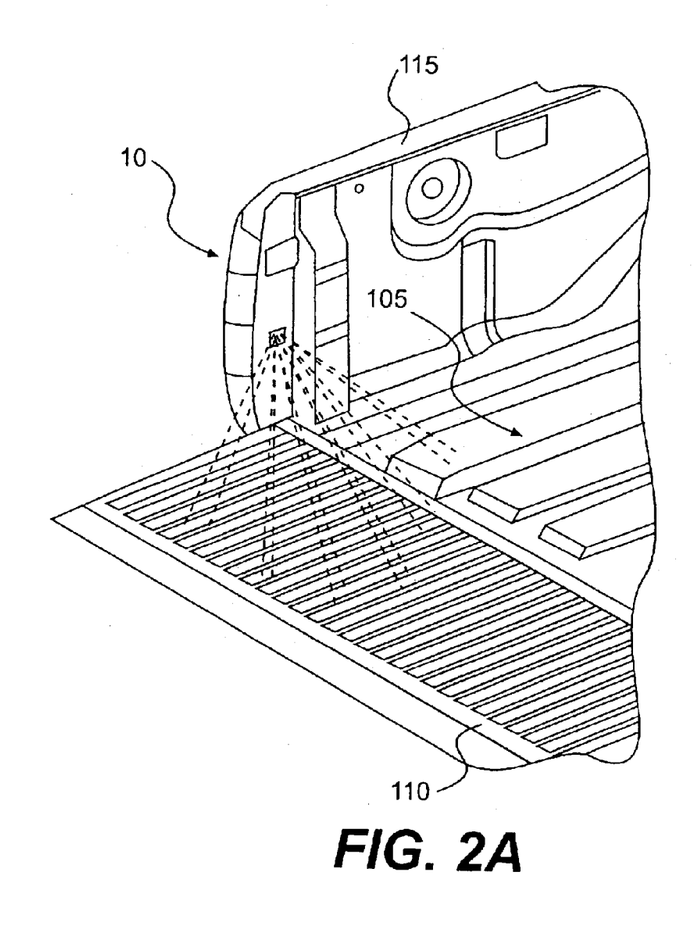
FIGS. 2A to 2B are perspective views of the rear cargo bed area of the vehicle that illustrate the illumination provided to that area by the vehicle combination lamp provided according to one aspect of the present invention.
Figure 2B:
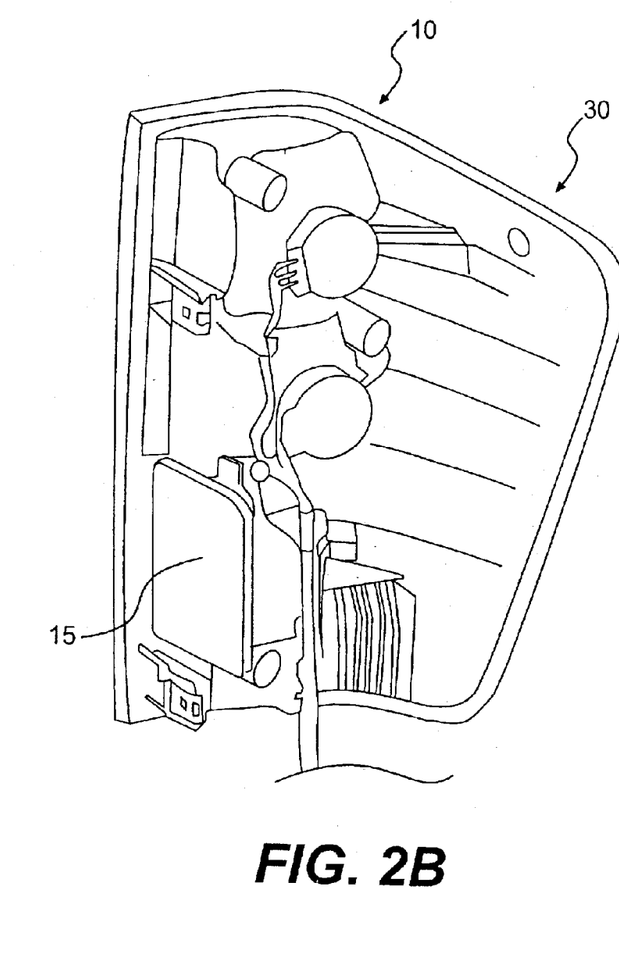

With reference to the figures, FIGS. 1, 2A and 2B disclose a vehicle cargo bed 105 of a vehicle 100 (for example, a pickup truck or sport utility truck) that has a vehicle combination light 10 provided according to one aspect of the present invention. FIGS. 1, 2A and 2B are provided for illustration purposes only and are not intended to limit the present invention; one skilled in the art would recognize various modifications and alternatives, all of which are considered to be a part of the present invention. FIG. 1 is a plan view of the cargo bed area 105 of the vehicle 100 with the tailgate 110 in an open position so that the illumination provided to that area by the vehicle combination light 10 can be seen. As seen in FIG. 1, the vehicle combination lamp provides greater illumination to middle and lower portions of the tailgate 110A (for example, a 40 Lx area) as compared to the upper edges of the tailgate 110B (for example, a 10 Lx area). FIG. 2A is a perspective view of the rear cargo bed area 105 of the vehicle and also illustrates the illumination provided to that area by the vehicle combination light 10 provided according to one aspect of the present invention. FIG. 2B is a perspective view of a vehicle combination light 10. As used herein, a "combination light" refers to one or more lights that are provided within one structural housing or framework. Furthermore, the vehicle combination "light" and "lamp" are used interchangeably herein.

The vehicle combination light 10 disclosed is a rear combination light 10 that provides some or all of the rear lights that are required for the vehicle 100. For example, the rear combination light 10 of a vehicle may include a taillight and/or brake light, a turn signal light, and/or a reversing light, all of which are contained or attached to a housing 30 of the rear combination light 10. As would be recognized by those skilled in the art, the taillight and/or brake light generates a red light, the turn signal light is a red or amber light, while the reversing light is white light. These colors are generally produced by the tint on the transparent (at least partially transparent) covers that cover the respective light sources that generate the light for the rear combination light 10. The rear combination light 10 also includes an accessory light unit 15 that illuminates the cargo bed area 105 of the vehicle 100 proximate to the tailgate 110 of the vehicle 100.

Figure 3A:
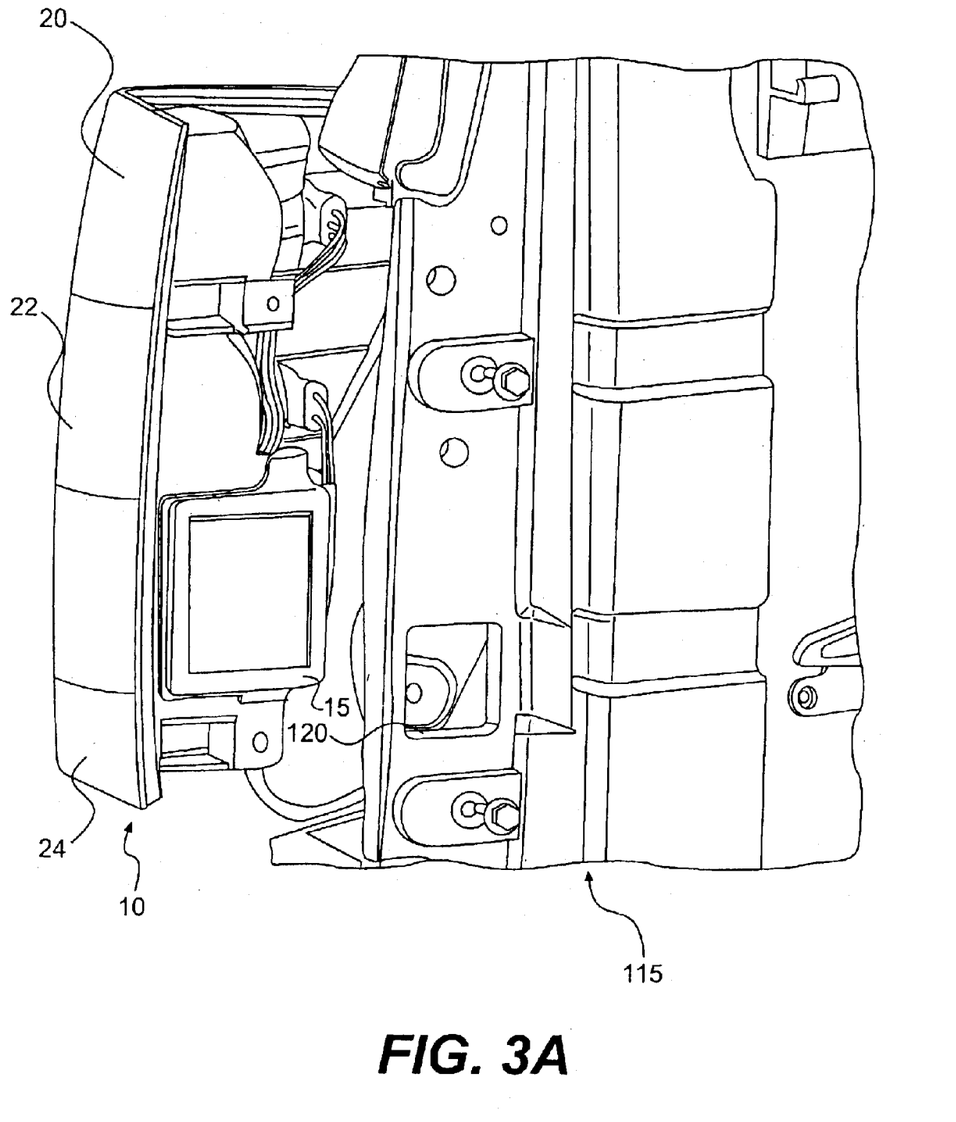
FIG. 3A is an exploded perspective view of the vehicle combination light and the side wall of the vehicle.
Figure 3B:
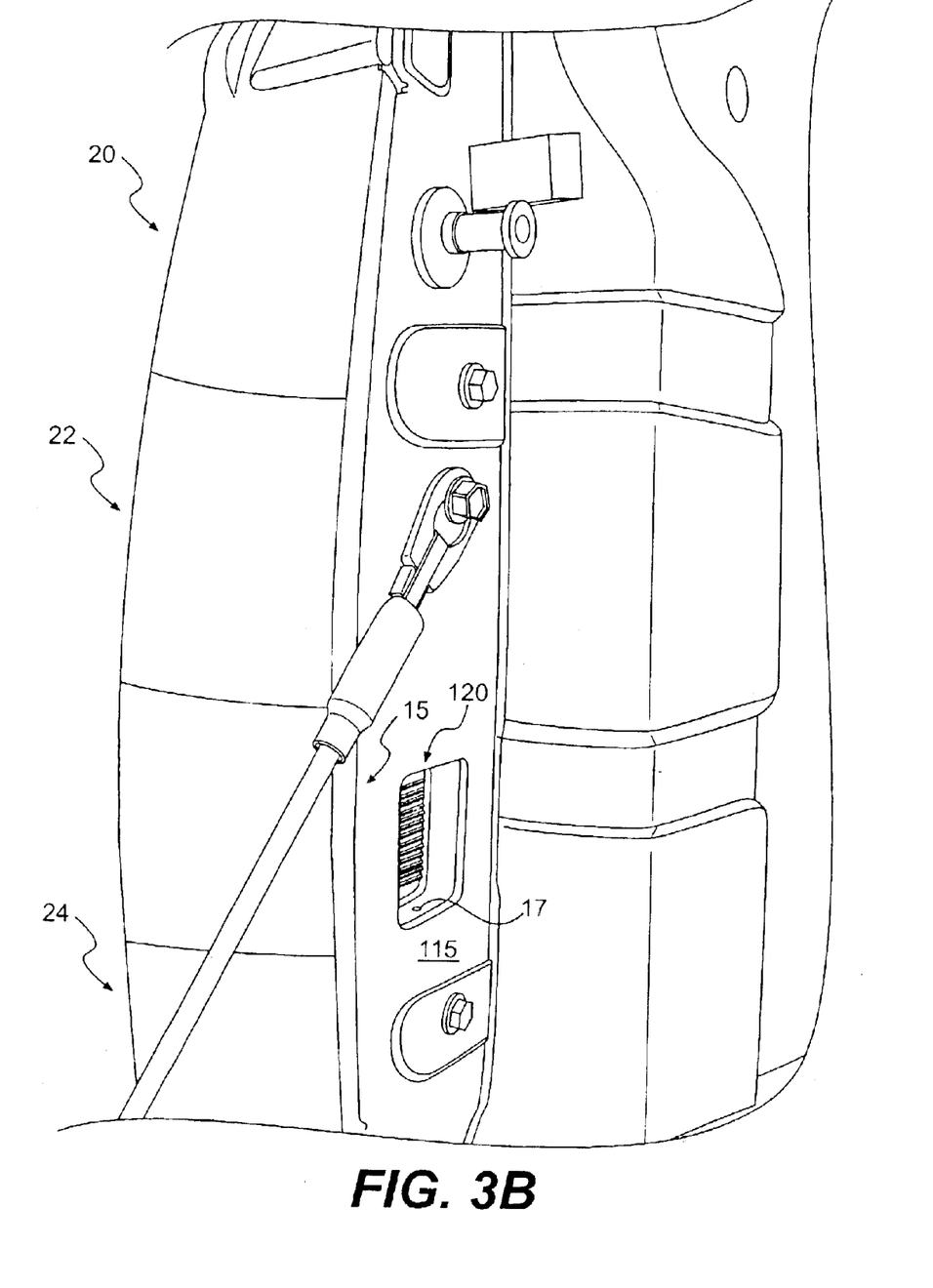
FIG. 3B is a perspective view in which the vehicle combination light is assembled with the side wall of the vehicle.

The vehicle combination light 10 and its housing 30 are assembled into the side wall 115 of the vehicle 100 so that the accessory light unit 15 generates light that is directed toward the cargo bed 105 of the vehicle. FIGS. 3A and 3B are perspective views of the vehicle combination light 10 and the side wall 115 of the vehicle 100 in which FIG. 3A is an exploded view with the vehicle combination light 10 and the side wall of the vehicle 115 separate from each other. FIG. 3B is a perspective view in which the vehicle combination light 10 is shown assembled with the side wall 115 of the vehicle. FIGS. 3A and 3B are provided for illustration purposes only and are not meant to limit the present invention; one skilled in the art would recognize various other modifications and alternatives, all of which are considered to be a part of the present invention.

As shown in FIGS. 3A and 3B, the vehicle light unit 10 includes a combination rear light for the vehicle 100. For example, light 20 may be a taillight and/or brake light. Light 22 may be used as a turn signal light, while light 24 may be a white light used for reversing. For example, the light 24 could be automatically controlled to switch on whenever a reverse gear was engaged by an operator of the vehicle 100. In this embodiment, all of these lights 20–24 are oriented so that they are directed towards a rear of the vehicle 100. The accessory light unit 15 provided by the present invention is arranged so that it is directed towards an interior of the cargo bed 105 of the vehicle 100. Furthermore, when assembled, the side wall 115 is provided with an opening 120 which aligns with the accessory light unit 15 so that the illumination generated by the accessory light unit 15 is directed toward the interior of the vehicle 100 (onto the cargo bed 105 and the tailgate 110).

The opening 120 can also be used to access the accessory light unit 15 for repair and replacement purposes. Therefore, the accessory light unit 15 may be accessed through the opening 120 in order to change light bulbs or to make adjustments, such as, for example, fixing or tightening any loose connections. Furthermore, since the accessory light unit 15 is provided embedded inside the opening 120, it is placed securely in a position by which it cannot be easily damaged by the cargo stored in the cargo bed because in this embodiment when the tailgate is closed, the tailgate covers the opening 120. The embedded position of the accessory light unit 15 also provides it with some protection from the weather and other elements that would not have been the case if the accessory light unit 15 protruded out of the contour of the vehicle 100.

One skilled in the art would recognize, that the vehicle combination light provided may also be used within an engine compartment or trunk of a sedan which are examples of vehicle compartments that are exterior to a vehicle's cabin. For example, a front vehicle combination light may include an accessory light that illuminates the engine compartment through an opening in a wall of the vehicle proximate the engine compartment. Likewise, a rear vehicle combination light may include an accessory light that illuminates the trunk of a sedan through an opening in a side wall of the vehicle that is proximate the trunk of the sedan. In another aspect of the present invention, a rear vehicle combination light may be attached to a side wall of the vehicle proximate a cargo area of a sports utility vehicle, station wagon, hatchback, or sports utility truck . The accessory light may then illuminate the cargo area of a sports utility vehicle, station wagon, hatchback, or sports utility truck through an opening in the side wall that faces toward the area to be illuminated.

In one embodiment, the accessory light unit 15 is operated by a switch (not shown) provided in the cabin of the truck or vehicle 100. Providing such a switch within the cabin of the truck or vehicle would be within the abilities of one skilled in the art. In another embodiment, as shown in FIG. 3B, a switch 17 can also be provided proximate the opening 120 so that the accessory light can be switched on or off by an operator when operating the tailgate without having to go back to the cabin to operate the accessory light. For example, the switch 17 may be provided in the recessed part of the opening 120 so that the switch 17 is flush with a surface of the recessed portion. In this way, the switch 17 can be conveniently operated by an operator positioned near the vehicle combination light without the light switch 17 protruding or interfering with either the cargo in the cargo bed or the access to the accessory light unit 15 through the opening 120. Advantageously, the vehicle 100 may be provided with both a switch in the cabin and a switch 17 proximate to the accessory light unit 15 so that the accessory light unit 15 can be operated from either location.

In one aspect, the present invention provides that the accessory light unit 15 includes one light source, such as a light bulb. However, the present invention also contemplates that the accessory light unit 15 may include multiple light bulbs so that greater reliability may be obtained since it is less likely that all the light bulbs would fail at the same time. Furthermore, the use of multiple light bulbs may also provide greater illumination than that achievable by the use of only one light bulb.

In one aspect, the accessory light unit 15 is designed as a removable modular unit that can be attached or detached from the housing 30 of the vehicle combination light 10. This provides for flexibility in the design and manufacture of the vehicle combination light 10 so that the accessory light unit 15 can be easily provided as an option without requiring extensive design or manufacturing changes.

Figure 8:
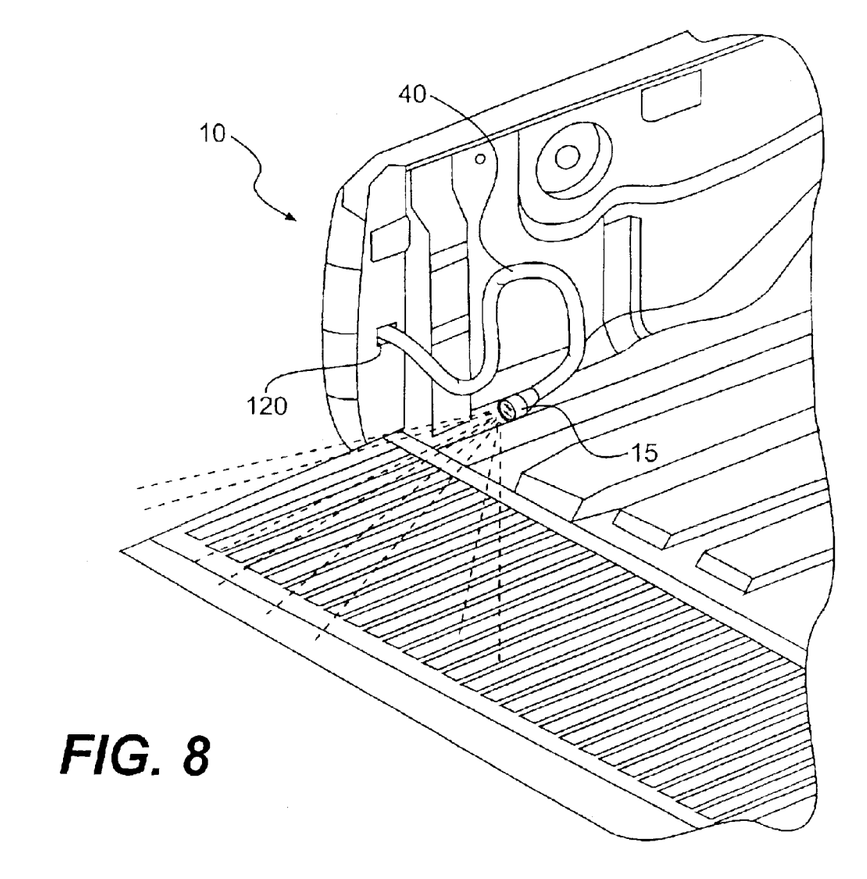
FIG. 8 is a perspective view illustrating the vehicle combination light with an accessory light connected to a tether.

In another aspect of the present invention, the accessory light unit 15 may be provided at the end of a tether 40 attached to the housing of the vehicle combination light 10 as shown for example in FIG. 8. The tether 40 may be retracted through the opening 120 in the side wall to a storage position in which the accessory light unit 15 (and the tether) can be stored within the housing of the vehicle combination light. The tether 40 may then be extended from the housing of the vehicle combination light 10 through the opening 120 in the side wall 115 of the vehicle so that the accessory light unit 15 may be manipulated to illuminate a greater range of areas. For example, the accessory light unit 15 may be manipulated to provide illumination from various different angles. This feature may be particularly advantageous when cargo is present in the cargo bed and the accessory light unit 15 needs to be manipulated to ensure adequate illumination of areas that would otherwise be blocked or obstructed by the cargo. Another use of the tether 40 would be to extend the accessory light unit 15 to illuminate an area outside of the vehicle or truck proximate to the tailgate. One such use would be to hitch a trailer to the vehicle or truck since the hitching mechanism is typically located outside the tailgate at a position that is very close to the ground level. A conventional exterior light positioned at a rear of a truck's cabin would be particularly ineffective in this situation since it would be obstructed by the tailgate itself even in the absence of any cargo in the cargo bed.

Furthermore, in alternate embodiments, for example, with a vehicle combination light provided on a wall of the vehicle, the tethered accessory light could be used to illuminate the engine compartment, the trunk, or the cargo area of the vehicle. That is, the accessory light would be accessible through an opening in the wall of the engine compartment, the trunk, or the cargo area so that the tethered light could be manipulated to illuminate the engine compartment, the trunk, or the cargo area or even areas proximate the engine compartment, the trunk, or the cargo area.

Figure 4:
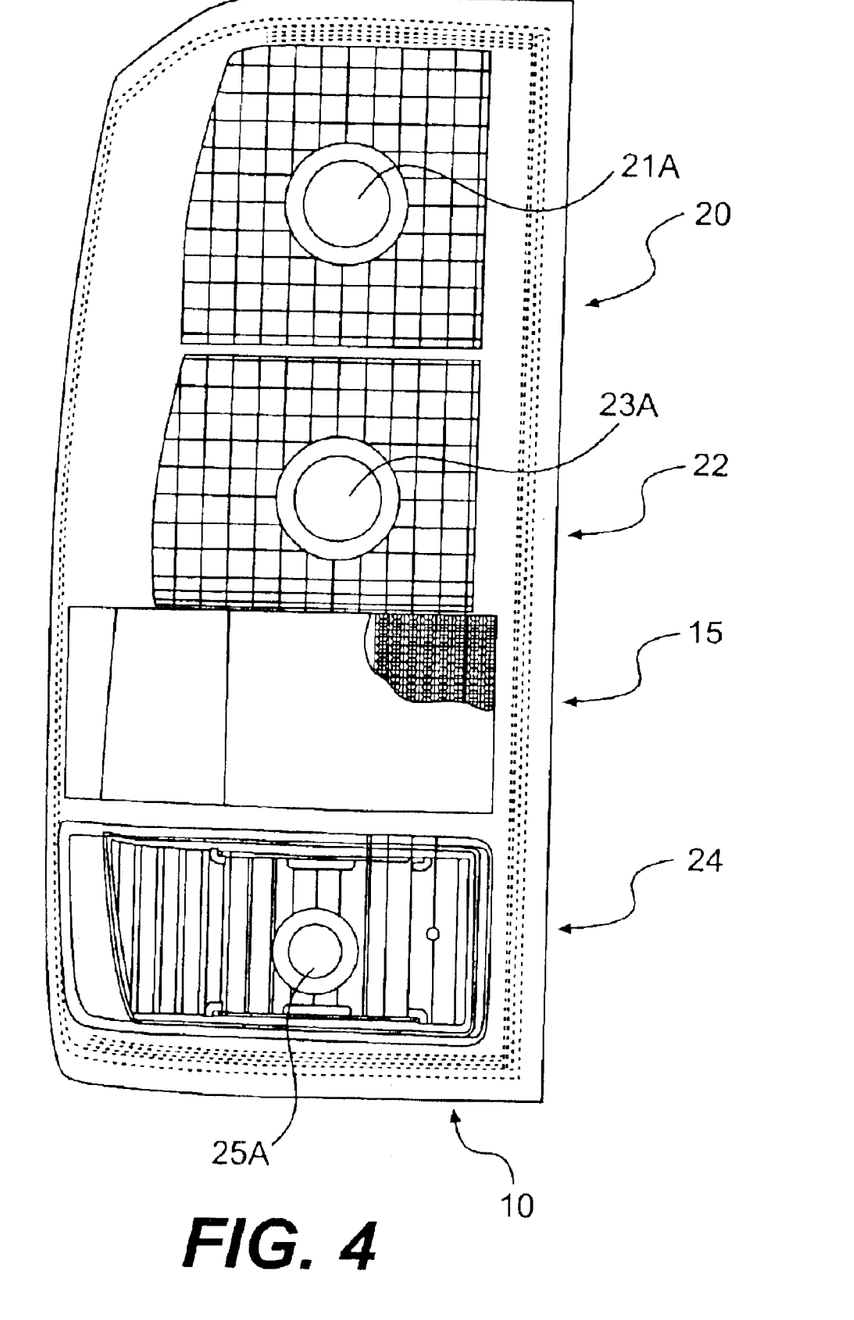
FIG. 4 is a schematic diagram illustrating a front view of the vehicle combination lamp as viewed from the rear of the vehicle.

FIGS. 4–7 are schematic diagrams that further illustrate one embodiment of the vehicle combination lamp according to the present invention. FIG. 4 is a schematic diagram illustrating a front view of the vehicle combination lamp 10 from the rear of the vehicle 100. As seen from the rear of the vehicle 100, the vehicle combination light 10 includes three lights that are directed towards a rear of the vehicle. A stop/brake light 20, a turn signal light 22, and a reversing light 24 are arranged so that the light generated from the respective reflectors 21A, 23A, and 25A of these lights is directed toward the rear (and possibly also to a side) of the vehicle. However, the portion of the vehicle combination light 10 corresponding to the accessory light unit 15 is a reflector (or may be translucent) when viewed from the rear of the vehicle. Therefore, none of the light generated by the accessory light unit 15 is visible from a rear of the vehicle.

Figure 5:
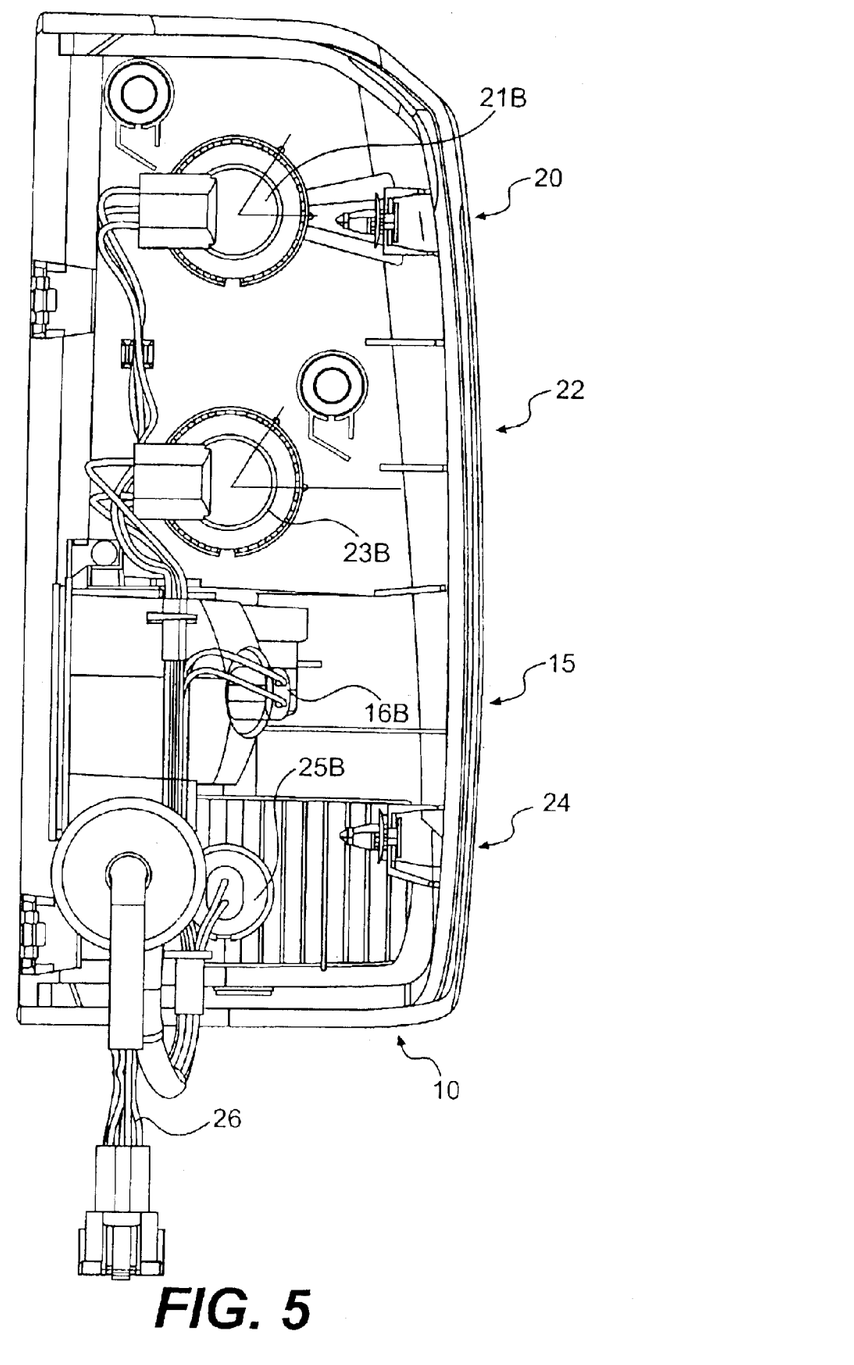
FIG. 5 is a schematic back view of the vehicle combination lamp as viewed from inside the vehicle while looking toward the rear of the vehicle.

FIG. 5 is a schematic back view of the vehicle combination lamp 10 viewed from inside the vehicle while looking toward the rear of the vehicle 100. In this view, the stop/brake light 20, the turn signal light 22, and the reversing light 24 are all oriented in one direction (to face the rear of the vehicle) while the accessory light unit 15 is oriented at an angle to the other lights such that it is arranged to project light toward an interior of the vehicle corresponding to the interior surface of the tailgate and the cargo bed area that is proximate to the tailgate. A common wiring harness 26 provides electric power to all the lights with appropriate leads branching out from the main harness to provide electric power to the respective sockets 21B, 23B, 16B, and 25B for each of the lights in the vehicle combination light 10.

Figure 6:
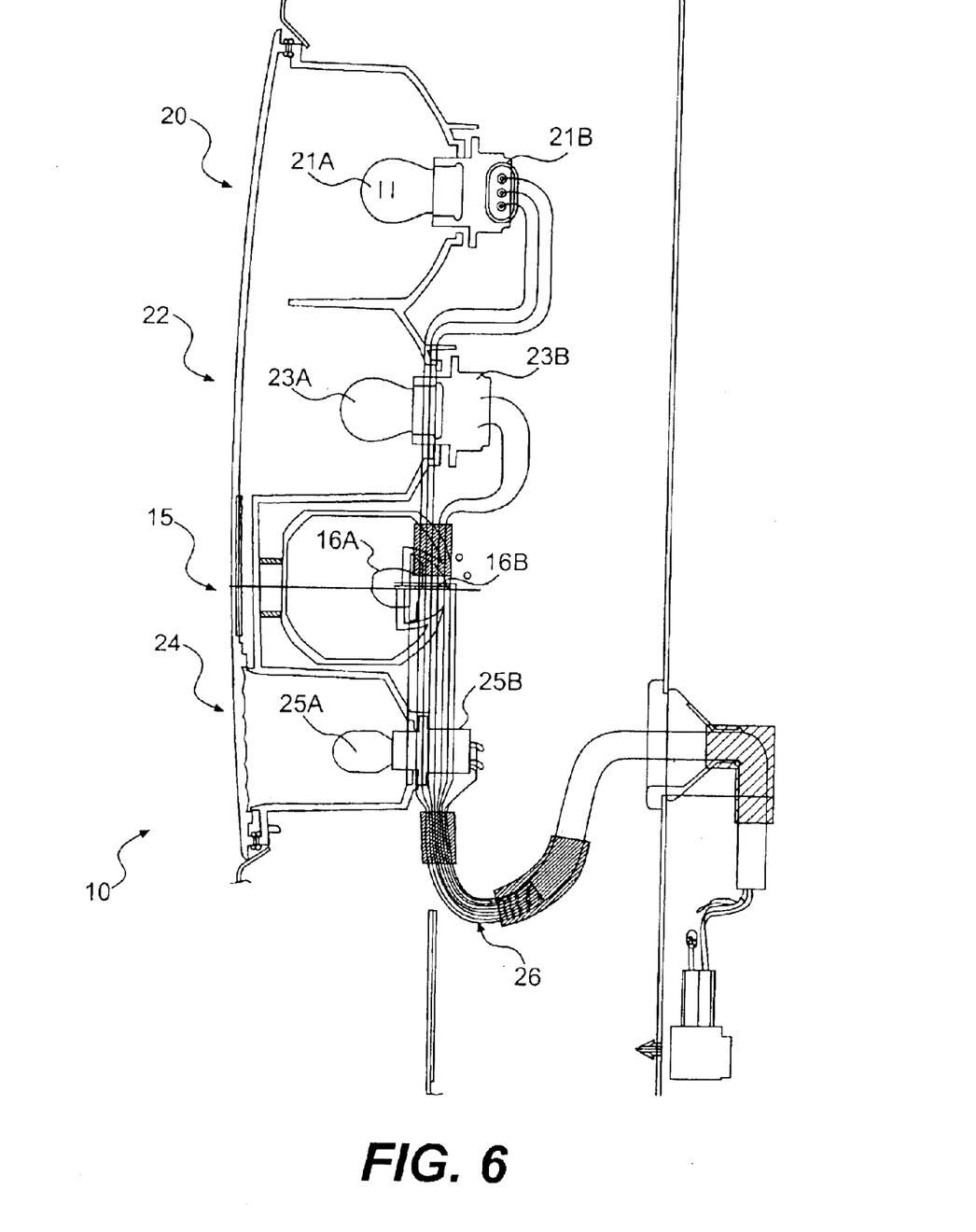
FIG. 6 is a schematic sectional side view of the vehicle combination lamp illustrating the wiring harness.

FIG. 6 is a schematic sectional side view of the vehicle combination lamp 10 and also illustrates the wiring harness 26. As shown in this figure, the lights 20, 22, and 24 are oriented substantially parallel to each other so their respective reflections 21A, 23A, and 25A project light toward the rear of the vehicle. The accessory light unit 15 is arranged at an angle to the other lights in the vehicle combination light 10 and is arranged so that its reflector 16A projects light toward the tailgate of the vehicle and the cargo bed area proximate to the tailgate of the vehicle. As discussed earlier, a common wiring harness 26 can be used to provide electric power for each of the lights in the vehicle combination light 10 through their respective sockets 21B, 23B, 16B, and 25B.

Figure 7:
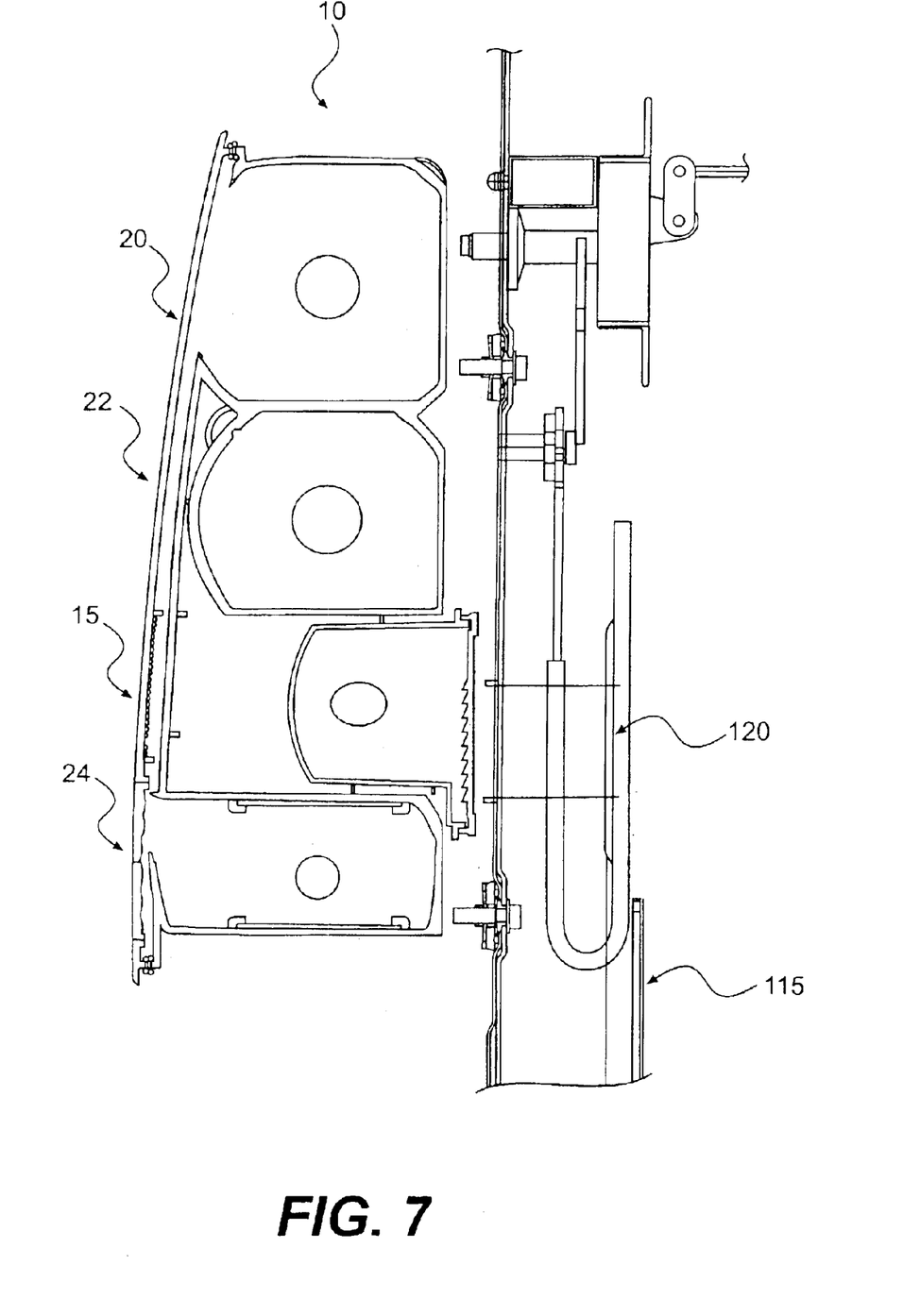
FIG. 7 is a schematic sectional front view of the vehicle combination lamp as viewed from the rear of vehicle.

FIG. 7 is a schematic sectional front view of the vehicle combination lamp 10 viewed from the rear of vehicle. FIG. 7 illustrates that the vehicle combination lamp 10 is designed so that the accessory light unit 15 is positioned and oriented to align with the opening 120 in the side wall of the vehicle 100. This allows the most effective illumination of the tailgate 110 and the cargo bed area adjacent to the tailgate 110 while the accessory light unit 15 is positioned at a location where it is securely located from being damaged when loading cargo in the cargo bed. Furthermore, the embedded location of the accessory light unit also provides some measure of protection from the weather or other external elements such as flying debris.

It should also be recognized that while the embodiment disclosed herein refers to a rear combination light with an accessory light unit that illuminates the rear cargo bed and the tailgate of the vehicle, the same principles could also be used to design a front combination light with an accessory light that illuminates, for example, the engine compartment. A tether based light may also be useful in illuminating the engine from various angles should such illumination be required for maintenance, repair, or diagnostic purposes.

Other embodiment of the invention will be apparent to those skilled in the art from a consideration of the specification and the practice of the invention disclosed herein. It is intended that the specification be considered as exemplary only, with the true scope and spirit of the invention also being indicated by the following claims and equivalents thereof.

What is claimed is:

1. A vehicle combination light for use in a vehicle having a compartment external to the vehicle cab, comprising:
    a housing;
    a combination light unit arranged in the housing and directed to at least a front or a rear of the vehicle; and
    an accessory light unit arranged in the housing and directed to an interior of the compartment,
    wherein the accessory light unit faces toward the interior of the compartment in order to illuminate the interior of the compartment,
    wherein the combination light unit is arranged in a side wall of the compartment external to the vehicle cab.

2. The vehicle combination light according to claim 1, wherein the accessory light unit is aligned with an opening in the side wall of the vehicle that opens toward the interior of the compartment.

3. The vehicle combination light according to claim 2, wherein the vehicle comprises a truck, the compartment comprises a rear cargo bed of the truck, the combination light unit is a rear combination light, and the accessory light unit and the opening in the side wall are arranged proximate to a tailgate of the truck.

4. The vehicle combination light according to claim 3, wherein the accessory light unit and the opening in the side wall are arranged proximate to a bottom portion of the tailgate of the truck.

5. The vehicle combination light according to claim 4, wherein the accessory light unit and the opening in the side wall are arranged proximate a hinge by which the tailgate is operated.

6. The vehicle combination light according to claim 3, wherein the housing is attached to the side wall of the truck.

7. The vehicle combination light according to claim 3, wherein the housing is attached at a rear end of the side wall of the truck.

8. The vehicle combination light according to claim 3, wherein the rear combination light comprises a brake light, a turn signal light, and a reversing light.

9. The vehicle combination light according to claim 3, further comprising:
    a retractable tether attached to the housing, wherein the accessory light unit is connected to one end of the tether.

10. The vehicle combination light according to claim 9, wherein the tether and accessory light unit can be extended through the opening in the wall so that the accessory light unit can be positioned to illuminate the rear cargo bed of the truck.

11. The vehicle combination light according to claim 9, wherein the tether and the accessory light unit can be extended through the opening in the side wall so that the accessory light unit can be positioned to illuminate an area outside the rear cargo bed of the truck.

12. The vehicle combination light according to claim 3, wherein the accessory light unit is configured to be operated by a switch provided inside the cab of the truck.

13. The vehicle combination light according to claim 3, wherein the accessory light unit is configured to be operated by a switch provided proximate to the accessory light unit.

14. The vehicle combination light according to claim 2, wherein the accessory light unit has a transparent cover facing the opening in the side wall.

15. The vehicle combination light according to claim 2, wherein the accessory light unit is formed as a modular removable unit.

16. The vehicle combination light according to claim 2, further comprising: a retractable tether attached to the housing, wherein the accessory light unit is connected to one end of the tether.

17. The vehicle combination light according to claim 16, wherein the tether and accessory light unit can be extended through the opening in the side wall so that the accessory light unit can be positioned to illuminate an engine compartment of the vehicle.

18. The vehicle combination light according to claim 16, wherein the tether and accessory light unit can be extended through the opening in the side wall so that the accessory light unit can be positioned to illuminate a trunk of the vehicle.

19. The vehicle combination light according to claim 1, wherein the accessory light unit comprises a plurality of lights.

20. A vehicle having a vehicle combination light, comprising:
    a side wall proximate a cargo bed of the vehicle, wherein the vehicle comprises a truck; and
    the vehicle combination light comprising:
        a housing;
        a combination light unit arranged in the housing and directed to at least a rear of the truck; and
        an accessory light unit arranged in the housing and directed toward the cargo bed of the truck,
    wherein the accessory light unit is aligned with an opening in the side wall of the pickup truck that faces toward the interior of the truck in order to illuminate the cargo bed of the truck.

21. The vehicle according to claim 20, further comprising a switch, arranged inside a cab of the truck, for operating the accessory light unit.

22. The vehicle according to claim 20, further comprising a switch, arranged proximate to the accessory light unit, for operating the accessory light unit.

23. The vehicle according to claim 20, wherein the accessory light unit and the opening are arranged proximate a bottom portion of a tailgate of the truck.

24. The vehicle according to claim 23, wherein vehicle combination light further comprises a tether, attached to the housing, to which the accessory light unit is connected, wherein the tether is designed to be extended through the opening to light the cargo bed of the truck or an area external to the truck, and is designed to be retracted through the opening for storage within the housing of the vehicle combination light.

25. A truck comprising:
    a cab;
    a cargo bed behind the cab;
    a tailgate at a rear end of the cargo bed; and
    an accessory light unit, illuminating a rear portion of the truck, positioned such that closing of the tailgate covers substantially all of the accessory light unit in a direction that is perpendicular to a longitudinal axis of the vehicle.

26. A truck according to claim 25, further comprising a tether connected to the accessory light unit.

27. The truck according to claim 25, wherein the accessory light unit is provided as a part of a rear combination light of the truck.

28. The truck according to claim 27, wherein the rear combination light comprises a housing, a combination light unit arranged in the housing and directing illumination to a rear of the truck, wherein the accessory light unit is arranged in the housing to direct illumination to the rear portion of the truck.

29. The truck according to claim 28, wherein the truck comprises a side wall with an opening that opens toward the rear portion of the truck, and wherein the accessory light unit is arranged in the housing to align with the opening such that illumination generated by the accessory light unit illuminates the rear portion of the truck through the opening in the side wall.

30. A vehicle combination light for illuminating a vehicle compartment, comprising:

a housing;

a combination light unit arranged in the housing and directed toward an exterior of the compartment;

an accessory light unit arranged in the housing and directed to an interior of the compartment, wherein the accessory light unit faces toward the interior of the compartment in order to illuminate the interior of the compartment, and wherein the housing is attached to a side wall of the vehicle and the accessory light unit is aligned with an opening in the side wall of vehicle that opens towards the interior of the compartment.

31. A vehicle comprising:

a vehicle compartment having a side wall; and a vehicle combination light comprising:

a housing;

a combination light unit arranged in the housing and directed toward an exterior of the compartment;

an accessory light unit arranged in the housing and directed to the interior of the compartment, wherein the accessory light unit faces toward the interior of the compartment in order to illuminate the interior of the compartment, and wherein the housing is attached to a side wall of the vehicle and the accessory light unit is aligned with an opening in the side wall of vehicle that opens towards the interior of the compartment.

32. The vehicle according to claim 31, wherein said vehicle comprises one of a sports utility vehicle, a station wagon, a hatchback, or a sports utility truck.

* * * * *